(No Model.) 2 Sheets—Sheet 1.
W. CARR & J. T. MALLAHAN.
CORN CUTTER.
No. 432,508. Patented July 22, 1890.
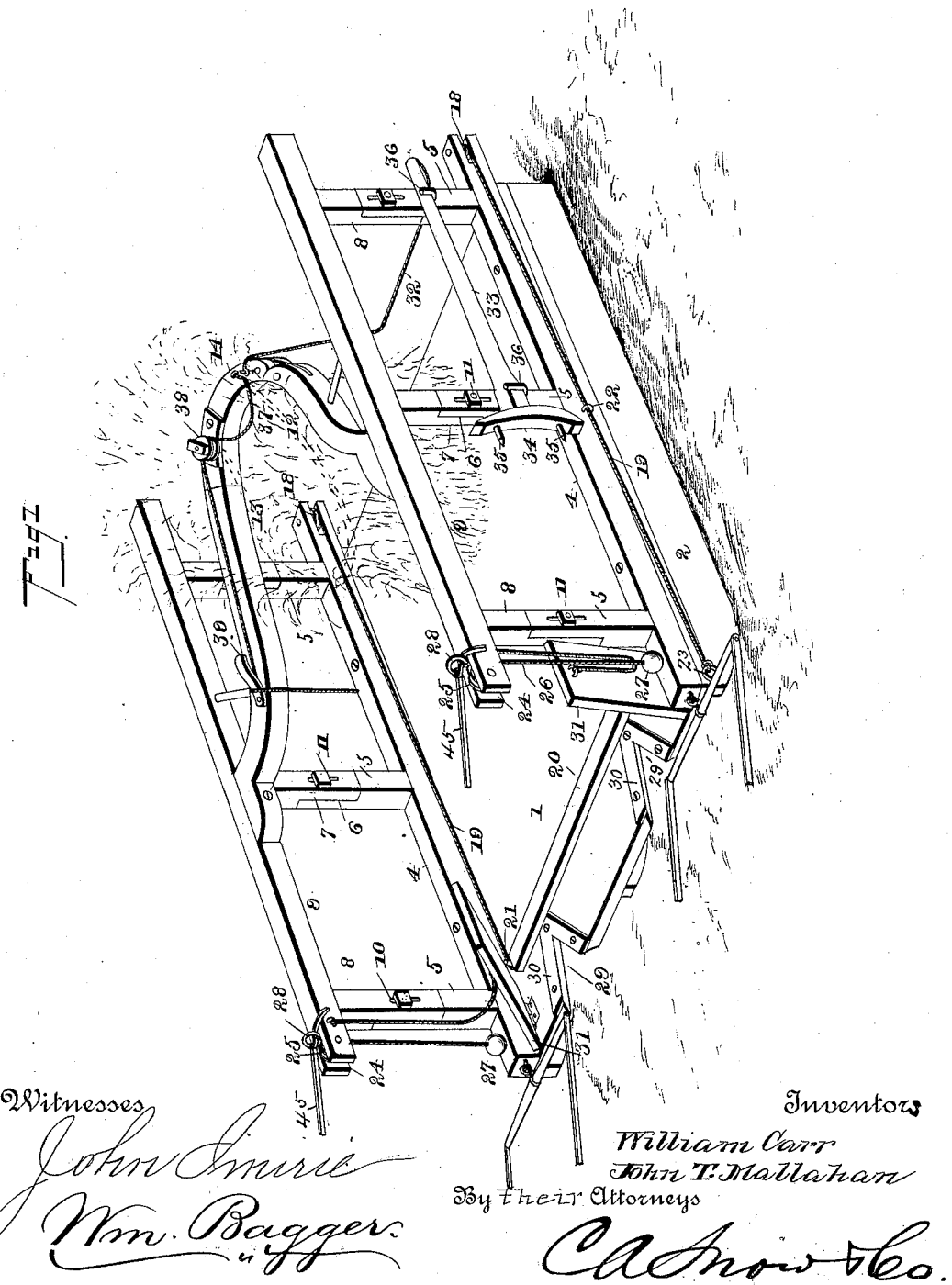

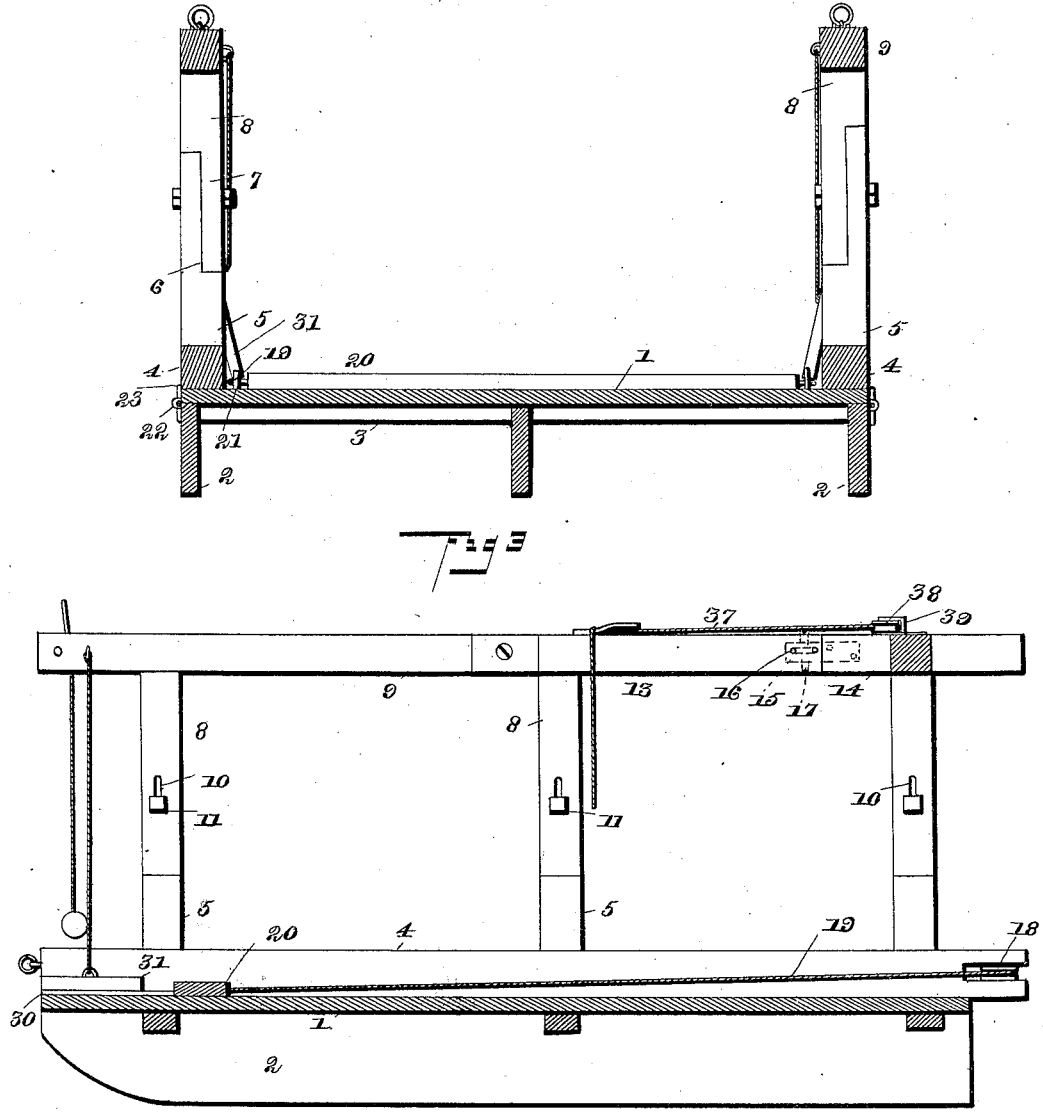

UNITED STATES PATENT OFFICE.

WILLIAM CARR AND JOHN T. MALLAHAN, OF OTTAWA, OHIO.

CORN-CUTTER.

SPECIFICATION forming part of Letters Patent No. 432,508, dated July 22, 1890.

Application filed January 8, 1890. Serial No. 336,268. (No model.)

*To all whom it may concern:*

Be it known that we, WILLIAM CARR and JOHN T. MALLAHAN, citizens of the United States, residing at Ottawa, in the county of Putnam and State of Ohio, have invented a new and useful Corn-Cutter, of which the following is a specification.

This invention relates to corn-cutters or corn-harvesters of that class which consist, essentially, of a horizontal platform mounted upon runners a suitable distance above the ground, and which are provided with cutting devices for the purpose of severing the corn-stalks, and with packing-chambers in which the cut corn may be accumulated until a sufficient quantity to form a shock has been gathered, when the said shock may be tied and dumped off the platform.

Our present invention consists in the improved construction, arrangement, and combination of parts, which will be hereinafter described, and particularly pointed out in the claims.

In the drawings, Figure 1 is a perspective view of our improved corn-cutter. Fig. 2 is a vertical transverse sectional view of the same. Fig. 3 is a vertical longitudinal sectional view.

Like numerals of reference indicate like parts in all the figures.

1 designates a platform of suitable dimensions, which is mounted upon runners 2 of ordinary construction. The said runners are preferably connected by means of transverse braces 3, which in turn serve to support the flooring or platform 1. Suitably secured at the edges of the platform 1 are the longitudinal cleats 4, having upwardly-extending braces or standards 5, the upper ends of which are mortised on their inner sides, as shown at 6, to receive the correspondingly-mortised lower ends 7 of the standards 8, depending from the guard-rails 9. The mortised ends of the standards 5 and 8 are provided with vertical slots 10, to receive the connecting-bolts 11, by means of which the guard-rails are secured in position in such a manner as to be vertically adjustable, as will be readily understood.

Suitably attached to the inner sides of the guard-rails 9 9 are the rearwardly and in-wardly extending brackets 12 and 13, to the former of which is hinged a curved arm 14. The free end of the latter is provided with a horizontally-slotted strap 15, adapted to engage a staple 16 extending from the arm 13, to which the free end of the curved arm 14 may thus be attached by means of a vertical pin 17.

The rear ends of the horizontal cleats 4 at the edges of the platform are provided with horizontally-arranged guide-pulleys 18, over which pass the ropes 19, the inner ends of which are connected by a horizontal bar 20. Vertical pins or stops 21 are arranged near the front corners of the platform for the purpose of retaining the said bar 20 in position when desired. The outer ends of the ropes 19 pass through staples or guide-eyes 22 upon the outer sides of the platform, and are extended to the front end of the platform, where they are provided with rings or links 23, for the attachment of the draft in, the manner and for the purpose which will be presently more fully described.

The front ends of the guard-rails 9 are provided with vertical recesses 24, in which are mounted the pulleys 25. Cords 26, which pass over the said pulleys, are provided at their lower ends with weights 27 and at their upper ends with rings or links 28, the purpose of which will be presently explained.

The front end of the platform is provided with V-shaped notches or recesses 29, over which are secured the V-shaped cutters 30. These cutters are arranged a distance apart which is equal to the usual distance between the rows of corn. At the inner edges of the said V-shaped recesses are hinged the guards 31, consisting of plates which are adapted to be folded over the cutters, so as to protect the latter when they are not in use. These guards will serve to prevent all danger of injury to the draft-animals by the latter backing against the machine when the latter is stationary.

Suitably attached to the hinged curved arm 14 is a rope 32, to the free end of which is attached a bar 33, the outer end of which has a curved cross-piece 34, provided with teeth or prongs 35. This device, which when not in use may be supported upon hooks 36, extending from one side of the platform, is in practice manipulated by one of the attendants like a fork to support and steady the shock when the latter is being discharged from the platform of the device.

37 designates a rope, which is attached to the curved arm 14 near the hinged end of the latter. Upon the upper side of the said hinged arm, near its free end, is mounted a pulley 38, over which the end of the rope 37 may be passed for the purpose of tightening the shock previous to tying the same. While the shock is being tied the free end of the rope 37 may be secured to a cleat or clasp 39, which is secured upon the upper side of the bracket 13.

The operation and advantages of our invention will be readily understood from the foregoing description, taken in connection with the drawings hereto annexed. When the device progresses over the field, the V-shaped cutters serve to sever the cornstalks, which by the attendants are placed into the receptacle formed by the rearwardly-extending arms 12 and 13 and the hinged curved arm 14, the free end of which latter is at the time locked or rigidly connected with the rear end of the arm or bracket 13. The guard-rails 9, carrying the brackets 12 and 13 and their attachments, may be adjusted vertically, in the manner described, to correspond with the height of the corn which is being cut. When a sufficient quantity of corn has been accumulated in the packing-receptacle, the machine will stop, the shock is tied, and the free end of the arm 14 is disconnected from the bracket 13. The draft, which during the operation of the machine was attached to the front corners of the latter, is now transferred to the links 23 at the front ends of the ropes 19. The guard 20 at the front inner ends of said ropes is now raised, so as to bear against the front end of the shock, which is thus by the draft attached to the outer front ends of the ropes 19 pushed off the platform. While this is being done the shock may be steadied and prevented from tilting by means of the steadying device 33, herein described, which is manipulated by one of the attendants, who grasps it by the handle and holds the toothed or pronged head 34 in contact with the rear side of the shock, using said steadying device much after the manner of a fork. The rings 28 at the upper ends of the weighted ropes 26 are connected with the reins or lines 45, by means of which the draft-animals are guided, it being understood that the draft-animals will usually proceed in a straight line without attention from the operators, and that the weighted ropes 26 merely serve to hold the reins or lines sufficiently taut. When, for the purpose of pushing the shock off the platform, the draft has been attached to the rings or links at the front ends of the ropes 19, the draft-animals will proceed a few feet in advance of the machine, which remains stationary, thus pushing the shock off the platform in the manner described. This having been accomplished, the horses are backed up to the machine, and the weighted ropes connected with the reins or lines will hold the latter taut and prevent them from being fouled without attendance or assistance from the operators, who are thus enabled to devote their entire attention to the transfer of the draft to the front end of the machine and to the restoring of the cross-bar 20 and ropes 19 to normal position.

Having thus described our invention, what we claim is—

1. In a corn-cutter, the combination of the platform mounted upon runners and having the V-shaped cutters at its front end, the vertically-adjustable guard-rails having the brackets extending rearwardly and inwardly from the middle portion thereof, and the curved arm hinged to the rear end of one of said brackets and adapted to have its free end connected with the rear end of the other bracket, substantially as and for the purpose set forth.

2. In a corn-cutter, the combination of the platform mounted upon runners and having V-shaped cutters at its front end, the cleats mounted longitudinally at the edges of said platform, the pulleys arranged horizontally at the rear ends of said cleats, the ropes passing over said pulleys with both ends extending forwardly on each side of the cleats, a transverse bar connecting the inner ends of said ropes, staples or guide-eyes arranged upon the outer sides of the platform for the passage of the outer ends of said ropes, and the rings or links attached to the outer front ends of said ropes, substantially as and for the purpose set forth.

3. In a corn-cutter, the combination of the platform mounted upon runners and having V-shaped cutters at its front end, the vertically-adjustable guard-rails having inwardly-extending brackets, the curved arm hinged to the inner end of one of said brackets and having its free end adapted to be attached to the inner end of the other bracket, the horizontal pulleys at the rear corners of the device, the ropes passing over said pulleys with both ends extending forward, the transverse bar connecting the inner ends of said ropes, and the links or rings attached to the outer front ends of said ropes, substantially as set forth.

4. In a corn-cutter, the combination of the platform having the guard-rails and the packing-receptacle attached to the latter, the pulleys at the rear corners of said platform, the ropes passing over said pulleys with both ends extending forward, the transverse bar connecting the inner ends of said ropes, and the pins or studs projecting upwardly from the platform near the front corners of the latter, substantially as and for the purpose set forth.

5. In a corn-cutter, the combination of the platform mounted upon runners and having V-shaped cutters at its front end, the vertically-adjustable guard-rails, the horizontal pulleys at the rear corners of the platform, the ropes passing over said pulleys with both ends extending forward, the transverse bar connecting the inner front ends of said ropes, the links attached to the outer front ends of said ropes, the pulleys at the front corners of the guard-rails, and the ropes passing over said pulleys and having weights at their lower ends and links or rings attached to their upper ends, substantially as and for the purpose set forth.

6. The combination, in a corn-cutter, of the platform mounted upon runners and having V-shaped cutters at its front end, the vertically-adjustable guard-plates, the brackets extending inwardly from the inner sides of the latter, the curved arm hinged to the inner end of one of said brackets and adapted to have its free end attached to the other bracket, the pulleys at the rear corners of the platform, the ropes passing over said pulleys with both ends extending forward and having their inner ends connected by a transverse bar, guide-eyes or staples for the outer ends of said ropes, the links or draft-rings attached to the latter, the vertically-arranged pulleys at the front ends of the guard-rails, and the ropes fastened over said pulleys and having weights at their lower ends and links or rings at their upper ends, substantially as set forth.

7. The herein-described corn-cutter, comprising the platform mounted upon runners and having the V-shaped cutters at its front end, the vertically-adjustable guard-rails having the inwardly-extending brackets, the hinged arm attached to one of said brackets and adapted to connect with the other, and the device for sliding or pushing the shock off said platform, substantially as and for the purpose herein set forth.

8. The combination of the platform, the guide-rails, the brackets 12 13, the hinged curved arm 14, the rope 37, secured to the latter near its hinged end, the pulley 38, mounted upon said hinged arm near its free end, and the cleat or clasp 39, secured upon the arm 13, substantially as and for the purpose set forth.

In testimony that we claim the foregoing as our own we have hereto affixed our signatures in presence of two witnesses.

WILLIAM CARR.
JOHN T. MALLAHAN.

Witnesses:
O. W. CRAWPIS,
WM. BOEHMER.